US010244785B2

(12) United States Patent
Mou et al.

(10) Patent No.: US 10,244,785 B2
(45) Date of Patent: Apr. 2, 2019

(54) THREE-DIMENSIONAL COOKING MACHINE

(71) Applicant: MICROJET TECHNOLOGY CO., LTD., Hsinchu (TW)

(72) Inventors: Hao-Jan Mou, Hsinchu (TW); Ta-Wei Hsueh, Hsinchu (TW); Yung-Lung Han, Hsinchu (TW); Chi-Feng Huang, Hsinchu (TW)

(73) Assignee: MICROJET TECHNOLOGY CO., LTD., Hsinchu (TW)

( * ) Notice: Subject to any disclaimer, the term of this patent is extended or adjusted under 35 U.S.C. 154(b) by 514 days.

(21) Appl. No.: 14/790,762

(22) Filed: Jul. 2, 2015

(65) Prior Publication Data

US 2016/0000139 A1    Jan. 7, 2016

(30) Foreign Application Priority Data

Jul. 3, 2014    (TW) .............................. 103122953 A

(51) Int. Cl.
| | |
|---|---|
| *A23P 1/08* | (2006.01) |
| *A23P 30/00* | (2016.01) |
| *A23P 20/20* | (2016.01) |
| *B33Y 30/00* | (2015.01) |
| *B33Y 50/02* | (2015.01) |
| *A23P 20/25* | (2016.01) |

(52) U.S. Cl.
CPC ............... *A23P 30/00* (2016.08); *A23P 20/20* (2016.08); *A23P 2020/253* (2016.08); *B33Y 30/00* (2014.12); *B33Y 50/02* (2014.12)

(58) Field of Classification Search
CPC .......... A23P 20/20; A23P 30/00; A23P 1/086; A23P 2020/253; B33Y 30/00; B33Y 50/02
See application file for complete search history.

(56) References Cited

U.S. PATENT DOCUMENTS

| | | | | |
|---|---|---|---|---|
| 6,280,785 | B1 * | 8/2001 | Yang ..................... | A21C 11/163 425/112 |
| 9,743,687 | B2 * | 8/2017 | Davila .................... | A21C 11/16 |
| 9,844,912 | B2 * | 12/2017 | Hemingway ......... | B29C 64/106 |
| 2004/0213878 | A1 * | 10/2004 | Woodhouse ......... | A23G 1/0063 426/383 |
| 2006/0099287 | A1 * | 5/2006 | Kim ....................... | B33Y 30/00 425/174.4 |
| 2008/0254172 | A1 * | 10/2008 | Woodhouse ......... | A23G 3/0027 426/231 |

(Continued)

FOREIGN PATENT DOCUMENTS

| | | |
|---|---|---|
| CN | 203391319 U | 1/2014 |
| CN | 203633481 U | 6/2014 |

*Primary Examiner* — Seyed Masoud Malekzadeh
(74) *Attorney, Agent, or Firm* — Kirton McConkie; Evan R. Witt

(57) ABSTRACT

A three-dimensional cooking machine includes a control computer and a food ingredient laminating device. The control computer is used for previously storing an image file of a desired food model and outputting a control command corresponding to the image file of the food model. The food ingredient laminating device includes an ink-jet printer. The ink-jet printer is controlled to perform a three-dimensional food laminating operation according to the control command from the control computer.

27 Claims, 5 Drawing Sheets

(56) References Cited

U.S. PATENT DOCUMENTS

| | | | | |
|---|---|---|---|---|
| 2009/0074928 A1* | 3/2009 | Pikalo | ............... | A23G 3/28 |
| | | | | 426/383 |
| 2009/0267269 A1* | 10/2009 | Lim | ............... | B29C 67/0059 |
| | | | | 264/401 |
| 2012/0251688 A1* | 10/2012 | Zimmerman | ......... | A23G 1/206 |
| | | | | 426/383 |
| 2012/0251689 A1* | 10/2012 | Batchelder | ........... | A23G 1/0056 |
| | | | | 426/383 |
| 2013/0034633 A1* | 2/2013 | von Hasseln | .......... | A23P 30/00 |
| | | | | 426/104 |
| 2014/0084583 A1* | 3/2014 | Hemingway | ....... | B29C 67/0059 |
| | | | | 285/374 |
| 2015/0352790 A1* | 12/2015 | Hadas | ............... | B29C 67/0088 |
| | | | | 700/119 |

* cited by examiner

THREE-DIMENSIONAL COOKING MACHINE

FIELD OF THE INVENTION

The present invention relates to a three-dimensional cooking machine, and more particularly to a three-dimensional cooking machine for laminating food ingredients to prepare delicious food products with various shapes.

BACKGROUND OF THE INVENTION

With the increasing development of science and technology, the three-dimensional printing technology is a new generation of the industrial revolution. The three-dimensional printing technology can break the limitations of the conventional cooking technologies and prepare creative dishes. While the chefs are devoted to make more distinctive creative dishes, the geometric shapes and precisions of many dishes are not artificially achieved. For example, an artificial cut engraving technology cannot be used to place an additional food ingredient into a food with a completely close surface and some hollow sites. In other words, it is a challenge to improve the decorating and cooking efficacy of the food.

The present invention provides a three-dimensional cooking machine in order to overcome the above drawbacks. That is, the three-dimensional cooking machine of the present invention can prepare delicious food products with various shapes while achieving the benefits of novelty, inventiveness and mass production. The three-dimensional cooking machine of the present invention will inevitably lead to a revolution in high-tech and traditional handmade dishes.

Therefore, there is a need of provides a three-dimensional cooking machine for laminating food ingredients to prepare delicious food products with various shapes.

SUMMARY OF THE INVENTION

An object of the present invention provides a three-dimensional cooking machine for laminating food ingredients to prepare delicious food products with various shapes.

In accordance with an aspect of the present invention, there is provided a three-dimensional cooking machine. The three-dimensional cooking machine includes a control computer and a food ingredient laminating device. The control computer is used for previously storing an image file of a desired food model and outputting a control command corresponding to the image file of the food model. The food ingredient laminating device includes an ink jet printer. The ink-jet printer is controlled to perform a three-dimensional food laminating operation according to the control command from the control computer.

In accordance with another aspect of the present invention, there is provided a three-dimensional cooking machine. The three-dimensional cooking machine includes a control computer and a food ingredient laminating device. The control computer is used for previously storing an image file of a desired food model and outputting a control command corresponding to the image file of the food model. The food ingredient laminating device includes a shape forming chamber and a light curing means. The shape forming chamber contains a fluidic food ingredient. The light curing means is movable according to a cross section profile of the food model. According to a control command from the control computer, the light curing means emits a light beam to cure the fluidic food ingredient so as to form a single layer structure matching the cross section profile of the food model. A three-dimensional food product is produced by laminating multiple single layer structures.

In accordance with another aspect of the present invention, there is provided a three-dimensional cooking machine. The three-dimensional cooking machine includes a control computer and a food ingredient laminating device. The control computer is used for previously storing an image file of a desired food model and outputting a control command corresponding to the image file of the food model. The food ingredient laminating device includes a construction chamber, a powder spreading mechanism and a movable light curing means. The powder spreading mechanism provides a powdery food ingredient to the construction chamber, and then the light curing means emits a light beam to cure the powdery food ingredient in the construction chamber according to the control command from the control computer, so that a single layer structure matching a cross section profile of the food model is formed. The powder spreading mechanism further provides a powdery food ingredient to the cured single layer structure in the construction chamber, and then the light curing means emits a light beam to cure the powdery food ingredient in the construction chamber according to the control command from the control computer, so that another single layer structure matching another cross section profile of the food model is formed. A three-dimensional food product is produced by laminating multiple single layer structures.

In accordance with another aspect of the present invention, there is provided a three-dimensional cooking machine. The three-dimensional cooking machine includes a control computer and a food ingredient laminating device. The control computer is used for previously storing an image file of a desired food model and outputting a control command corresponding to the image file of the food model. The food ingredient laminating device includes a construction chamber, a powder spreading mechanism and an ink-jet printer. The powder spreading mechanism provides a powdery food ingredient to the construction chamber, and the ink-jet printer ejects a fluidic binder on the powdery food ingredient according to the control command from the control computer, so that the fluidic binder and the powdery food ingredient stick together to form a single layer structure matching a cross section profile of the food model. The powder spreading mechanism further provides a powdery food ingredient to the solidified single layer structure in the construction chamber, and then the ink-jet printer ejects a fluidic binder on the powdery food ingredient in the construction chamber according to the control command from the control computer, so that the fluidic binder and the powdery food ingredient stick together to form another single layer structure matching another cross section profile of the food model. A three-dimensional food product is produced by laminating multiple single layer structures.

In accordance with another aspect of the present invention, there is provided a three-dimensional cooking machine. The three-dimensional cooking machine includes a control computer and plural food ingredient laminating devices. The control computer is used for previously storing image files of plural desired food models and outputting a control command corresponding to the image files of the plural food models. The plural food ingredient laminating devices are controlled to perform three-dimensional food laminating operations simultaneously according to the control command from the control computer, so that plural dishes are prepared by the plural food ingredient laminating devices simultaneously. Under this circumstance, the cooking time is saved, and plural delicious dishes can be prepared simultaneously.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
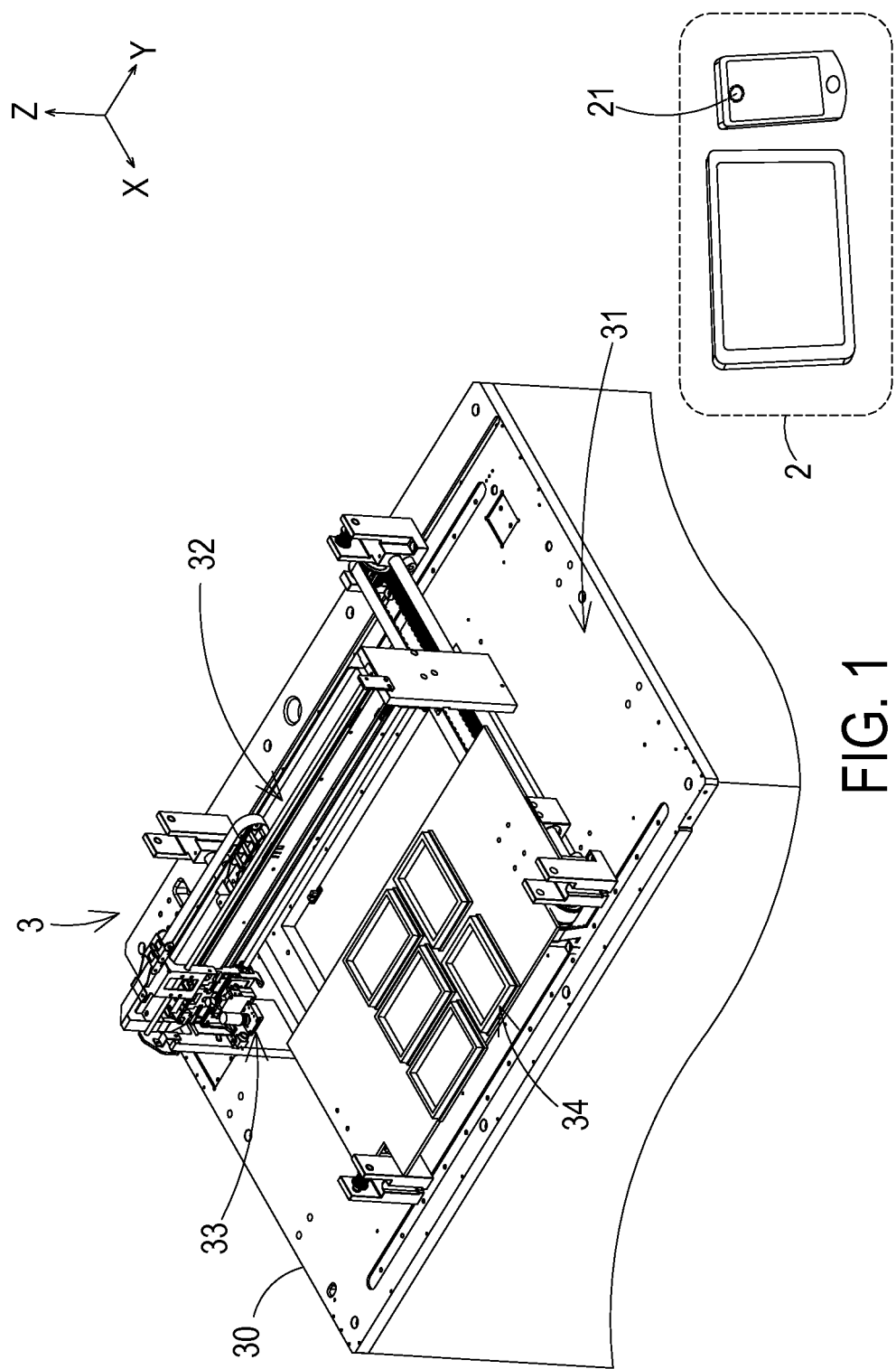
FIG. 1 is a schematic perspective view illustrating an ink-jet printer of a three-dimensional cooking machine according to a first embodiment of the present invention.

FIG. 1 is a schematic perspective view illustrating an ink-jet printer of a three-dimensional cooking machine according to a first embodiment of the present invention. As shown in FIG. 1, the three-dimensional cooking machine 1 comprises a control computer 2 and a food ingredient laminating device 3.

The control computer 2 is used for previously storing an image file of a desired food model and outputting a control command corresponding to the image file of the food model. For example, the control computer 2 is a tablet computer, a mobile phone, a smart phone, a wearable device or any other comparable device. Moreover, the control computer 2 further comprises a three-dimensional scanner 21 for scanning a three-dimensional food and obtaining an image file of the three-dimensional food, so that the image file is previously stored.

In some embodiments, the three-dimensional cooking machine 1 comprises plural food ingredient laminating devices 3. According to the control command from the control computer 2, the plural food ingredient laminating devices 3 perform three-dimensional food laminating operations simultaneously. Consequently, the plural food ingredient laminating devices 3 can cook plural dishes at the same time. Under this circumstance, the cooking time is saved, and plural delicious dishes can be prepared simultaneously.

For example, the food ingredient laminating device comprises an ink-jet printer or a light curing device for performing a three-dimensional food laminating operation. A process of performing the three-dimensional food laminating operation by the food ingredient laminating device will be illustrated as follows.

The food ingredient laminating device 3 comprises an ink-jet printer 30 for performing the three-dimensional food laminating operation according to the control command from the control computer 2.

Please refer to FIG. 1 again. The ink-jet printer 30 comprises a working platform 31, a movable carrying mechanism 32, at least one printhead 33 and at least one base 34. Each base 34 is a sterile container that is placed on the working platform 31 for containing food. The movable carrying mechanism 32 is located over the working platform 31. According to the control command from the control computer 2, the movable carrying mechanism 32 is controlled to be moved along two horizontal axis directions (e.g., the X-axis direction and the Y-axis direction) and a vertical axis direction (e.g., the Z-axis direction). The at least one printhead 33 is supported on the movable carrying mechanism 32. Since the at least one printhead 33 is moved with the movable carrying mechanism 32, the at least one printhead 33 is freely moved along the three directions (i.e., the horizontal axis directions and the vertical axis direction) to eject the food ingredient on the at least one base 34 and laminate the food ingredient as a three-dimensional food product.

Figure 2:
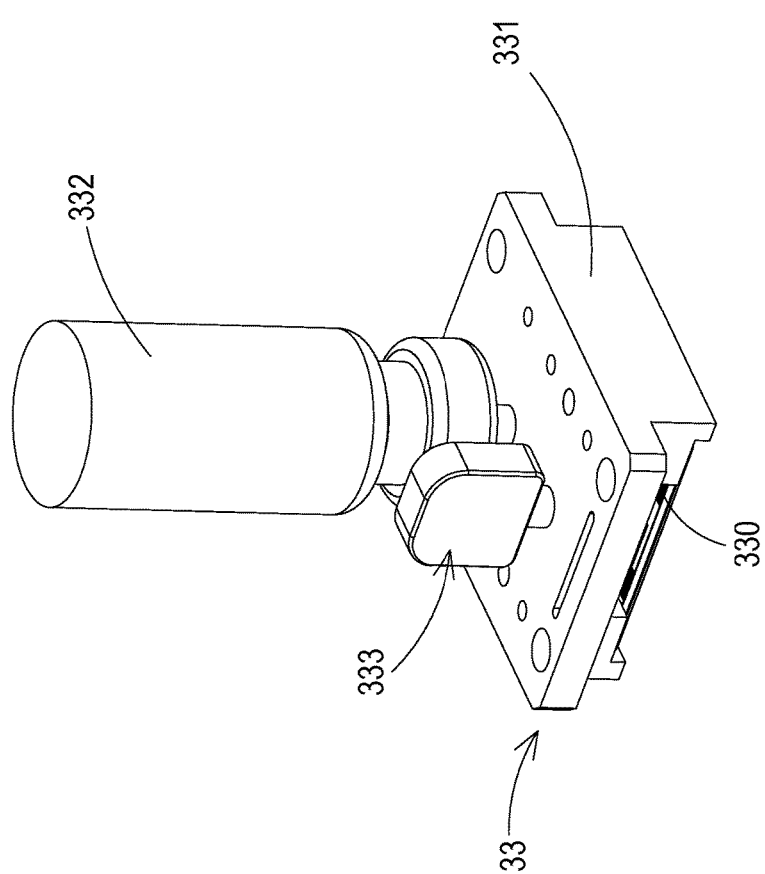
FIG. 2 is a schematic perspective view illustrating the printhead of the ink-jet printer of the three-dimensional cooking machine according to the first embodiment of the present invention.

FIG. 2 is a schematic perspective view illustrating the printhead of the ink-jet printer of the three-dimensional cooking machine according to the first embodiment of the present invention. Each of the at least one printhead 33 comprises a printhead platform 331, a food ingredient supply tank 332 and plural nozzles 330. The food ingredient supply tank 332 contains a food ingredient. The nozzle 330 is in communication with the food ingredient supply tank 332. Since the path of moving the food ingredient is controlled by the control computer 2 according to the control command, the food ingredient in the food ingredient supply tank 332 is ejected from the nozzle to perform the three-dimensional food laminating operation by laminating multiple layers of the food ingredient.

In an embodiment, the food ingredient is a fluidic bio-ink composed of tissue cells or cellular tissue foundations of animal organs, wherein the fluidic bio-ink is obtained from body cells of animals and cultivated on a large scale. In another embodiment, the food ingredient is a fluidic native food ingredient or a fluidic molecular food ingredient (food processing ingredient) composed of grains and root vegetables, fruits and vegetables, fruits, protein meat and fishes, milk, oil, sugar and so on. In another embodiment, the food ingredient is a fluidic spice adhesive. In another embodiment, the food ingredient is a fluidic additive composed of cellulose, vitamin, dietary mineral, protein, lipid, carbohydrate, glucose and so on. In another embodiment, the food ingredient is a fluidic food coloring agent. Moreover, if plural food ingredients are accommodated within the food ingredient supply tanks of plural printheads, the three-dimensional cooking machine can produce the three-dimensional food product in the laminating manner according to the desired food ingredients and the desired seasonings.

Please refer to FIG. 2 again. The printhead 33 is ink-jet printer is a disposable printhead that is specially used for the biomedical device and fabricated in a nontoxic and sterile environment, so that the printhead 33 has enhanced reliability. As shown in FIG. 2, the printhead 33 comprises the printhead platform 331, the food ingredient supply tank 332 and a pressure regulator 333. The food ingredient supply tank 332 is located over the printhead platform 331 and contains a food ingredient. The printhead platform 331 comprises a printhead chamber (not shown) and the plural nozzles 330. The plural nozzles 330 are located under the printhead chamber. Moreover, the plural nozzles 330 are in communication with the printhead chamber. The food ingredient supply tank 332 and the pressure regulator 333 are in communication with the printhead chamber. By the pressure regulator 333, the internal pressure within the food ingredient supply tank 332 is adjusted to be maintained at a negative pressure. Consequently, if the control command from the control computer 2 is not received, the food ingredient is not leaked out from the nozzles 330. Moreover, the ink drops from the nozzles 330 can be finely controlled to comply with the following conditions: the volume of the ink drop is in the range between 0.1~20000 picoliter, the diameter of the ink drop is in the range between 0.05 and 200000 picometer, the volume error of the ink drop is ±20%, the ejection rate of the ink drop is in the range between 0-10000 drops/second. Consequently, according to the control command from the control computer 2, the food ingredient is ejected out from the plural nozzles and printed on the at least one base 34. Moreover, as the printhead 33 is moved with the movable carrying mechanism 32 along the two horizontal axis directions (e.g., the X-axis direction and the Y-axis direction), a single layer structure of the three-dimensional food product is printed out. After the single layer is profile is formed, the printhead 33 is moved with the movable carrying mechanism 32 along the vertical axis direction (e.g., the Z-axis direction). The above steps are repeatedly done until the three-dimensional food product is produced in the laminating manner.

In some embodiments, the at least one printhead 33 comprises plural printheads, and the plural printheads are installed in a printer platform. The printer platform is disposed on the movable carrying mechanism 32 and arranged along one of the two horizontal axis directions. Moreover, the printer platform is movable forwardly and backwardly in bidirectional reciprocation. In some other embodiments, the plural printheads are installed in a printer platform, and the printer platform is a page-width printing mechanism with plural immobile printheads. The printer platform is disposed on the movable carrying mechanism 32 and arranged along one of the two horizontal axis directions.

In an embodiment, the food ingredient is a fluidic bio-ink composed of tissue cells or cellular tissue foundations of animal organs, wherein the fluidic bio-ink is obtained from body cells of animals and cultivated on a large scale. In another embodiment, the food ingredient is a fluidic or powdery native food ingredient or a fluidic or powdery molecular food ingredient (food processing ingredient) composed of grains and root vegetables, fruits and vegetables, fruits, protein meat and fishes, milk, oil, sugar and so on. In another embodiment, the food ingredient is a fluidic or powdery spice adhesive. In another embodiment, the food ingredient is a fluidic or powdery additive composed of cellulose, vitamin, dietary mineral, protein, lipid, carbohydrate, glucose and so on. In another embodiment, the food ingredient is a fluidic or powdery food coloring agent. Moreover, if plural food ingredients are accommodated within the food ingredient supply tanks of plural printheads, the three-dimensional cooking machine can produce the three-dimensional food product in the laminating manner according to the desired food ingredients and the desired seasonings.

In the above embodiments, the three-dimensional cooking machine 1 can produce the desired three-dimensional food product by using the printhead 33 of the ink-jet printer 3 to extrude or print out the food ingredient in a laminating manner. In another embodiment, the three-dimensional cooking machine can produce the desired three-dimensional food product by spreading the powdery food ingredient in the laminating manner.

Figure 3:
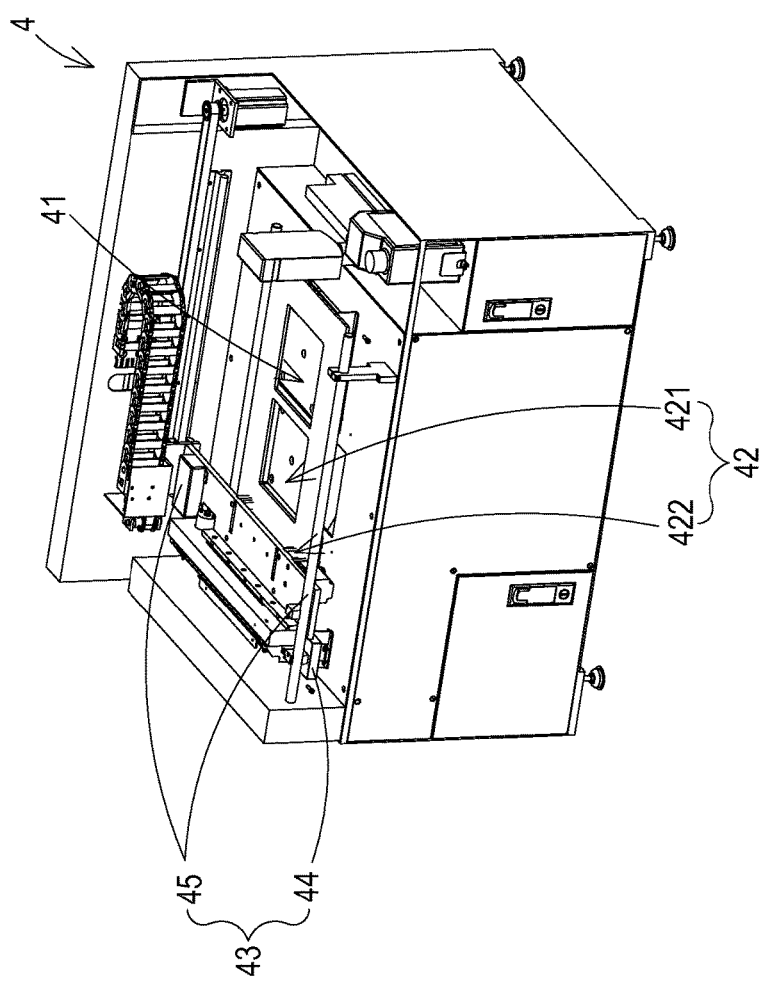
FIG. 3 is a schematic perspective view illustrating a food ingredient laminating device of a three-dimensional cooking machine according to a second embodiment of the present invention.

FIG. 3 is a schematic perspective view illustrating a food ingredient laminating device of a three-dimensional cooking machine according to a second embodiment of the present invention. As shown in FIG. 3, the food ingredient laminating device 4 comprises a construction chamber 41, a powder spreading mechanism 42 and an ink jet printer 43. The ink-jet printer 43 also comprises a disposable printhead 44 and a movable carrying mechanism 45. The disposable printhead 44 is specially used for the biomedical device. Similarly, the printhead 44 comprises a printhead platform, a food ingredient supply tank, a pressure regulator and plural nozzles. The food ingredient supply tank is located over the printhead platform and contains a food ingredient. The structure of the printhead, the operation of the printhead and the applications of plural printheads are similar to those of the above printhead 33 of the first embodiment (See FIG. 2), and are not redundantly described herein. The operations of the food ingredient laminating device will be illustrated as follows. Firstly, the powder spreading mechanism provides a layer of powdery food ingredient to the construction chamber 41. Then, according to the control command from the control computer 2, the printhead 44 of the ink-jet printer 43 ejects a fluidic binder on the powdery food ingredient. After the fluidic binder and the powdery food ingredient stick together to become solidified, a single layer structure matching the cross section profile of the food model is produced. Then, the powder spreading mechanism 42 provides another layer of powdery food ingredient to the solidified single layer structure in the construction chamber 41. Then, according to the control command from the control computer 2, the printhead 44 of the ink-jet printer 43 ejects the fluidic binder on the powdery food ingredient. After the fluidic binder and the powdery food ingredient stick together to become solidified, another single layer structure matching the cross section profile of the food model is produced. After the above steps are repeatedly done, the three-dimensional food product is produced by laminating multiple layers of the food ingredient.

In this embodiment, the powder spreading mechanism 42 comprises a powder feeder 421 and a powder spreader 422. The powder feeder 421 is used for containing the powdery food ingredient and allowing the powdery food ingredient therein to be moved upwardly or downwardly. The powder spreader 422 is located over the ink-jet printer 43 and moved with the ink-jet printer 43. As the powdery food ingredient in the powder feeder 421 is moved upwardly, the topmost layer of powdery food ingredient is pushed to the construction chamber 41 by the powder spreader 422.

In an embodiment, the powdery food ingredient is a powdery native food ingredient or a powdery molecular food ingredient composed of grains and root vegetables, fruits and vegetables, fruits, protein meat and fishes, milk, oil, sugar and so on. The powdery food ingredient and the desired food ingredient are laminated in the construction chamber 41 so as to produce the desired three-dimensional food product.

In an embodiment, the fluidic binder is a fluidic bio-ink composed of tissue cells or cellular tissue foundations of animal organs, wherein the fluidic bio-ink is obtained from body cells of animals and cultivated on a large scale. In another embodiment, the fluidic binder is a fluidic spice adhesive. In another embodiment, the fluidic binder is a fluidic binder additive composed of cellulose, vitamin, dietary mineral, protein, lipid, carbohydrate and glucose. In another embodiment, the fluidic binder is a fluidic food coloring agent. Moreover, if plural fluidic binders are accommodated within the food ingredient supply tanks of plural printheads, the three-dimensional cooking machine can produce the three-dimensional food product in the laminating manner according to the desired food ingredients and the desired seasonings.

In the above embodiments, the three-dimensional cooking machine 1 can produce the desired three-dimensional food product by using the printhead of the ink-jet printer to extrude or print out the food ingredient in a laminating manner (See FIG. 1). In another embodiment, the three-dimensional cooking machine can produce the desired three-dimensional food product by spreading powdery food ingredient in the laminating manner (See FIG. 3). For example, the food ingredient laminating device is a light curing device for performing a three-dimensional food laminating operation.

Figure 4:
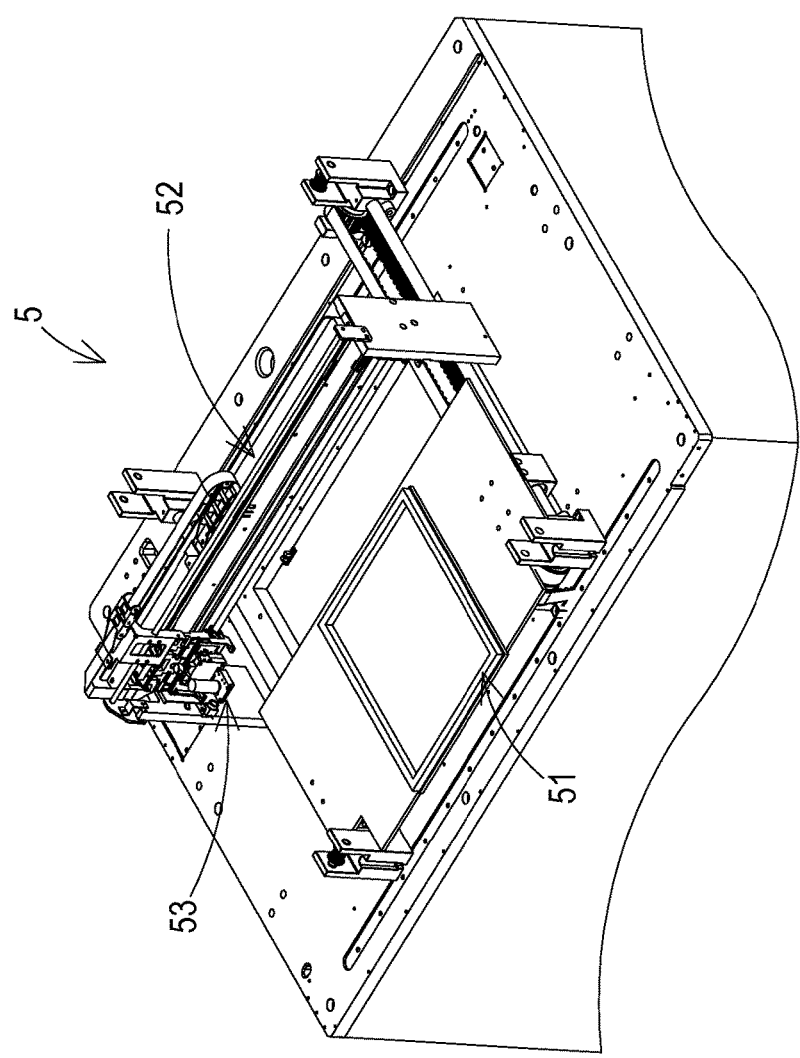
FIG. 4 is a schematic perspective view illustrating a food ingredient laminating device of a three-dimensional cooking machine according to a third embodiment of the present invention.

FIG. 4 is a schematic perspective view illustrating a food ingredient laminating device of a three-dimensional cooking machine according to a third embodiment of the present invention. As shown in FIG. 4, the food ingredient laminating device 5 comprises a shape forming chamber 51, a movable carrying mechanism 52 and a light curing means 53. The shape forming chamber 51 contains a fluidic food ingredient. The light curing means 53 is movable according to a cross section profile of the food model. According to a control command from the control computer 2, the light curing means 53 emits a light beam to cure the fluidic food ingredient so as to form a single layer structure matching the cross section profile of the food model. After the above steps are repeatedly done, a three-dimensional food product is produced by laminating multiple single layer structures. The light curing means 53 is supported on the movable carrying mechanism 52 and moved with the movable carrying mechanism 52.

In an embodiment, the food ingredient is a fluidic native food ingredient or a fluidic molecular food ingredient composed of grains and root vegetables, fruits and vegetables, fruits, protein meat and fishes, milk, oil, sugar and so on.

In the above embodiment, the desired three-dimensional food product is directly formed in the shape forming chamber 51 containing a fluidic food ingredient through the light beam from the light curing means 53. In some other embodiments, the three-dimensional cooking machine of the present invention can produce the desired three-dimensional food product by spreading a powdery food ingredient and using a light curing means.

Figure 5:
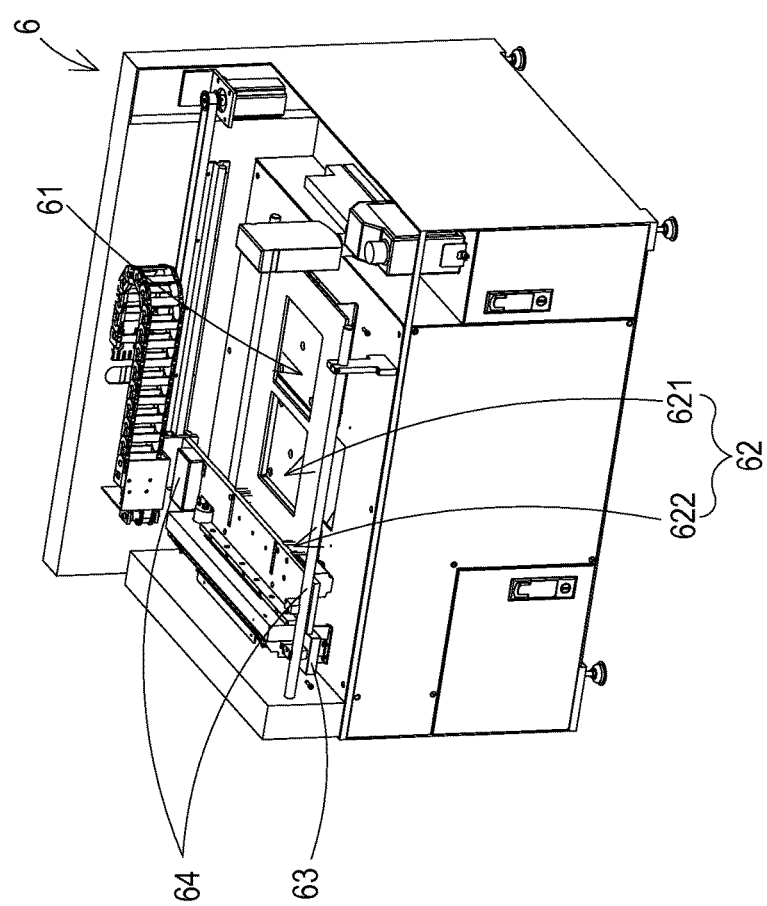
FIG. 5 is a schematic perspective view illustrating a food ingredient laminating device of a three-dimensional cooking machine according to a fourth embodiment of the present invention.

FIG. 5 is a schematic perspective view illustrating a food ingredient laminating device of a three-dimensional cooking machine according to a fourth embodiment of the present invention. As shown in FIG. 5, the food ingredient laminating device 6 comprises a construction chamber 61, a powder spreading mechanism 62, a movable light curing means 63 and a movable carrying mechanism 64. The operations of the food ingredient laminating device will be illustrated as follows. Firstly, the powder spreading mechanism 62 provides a layer of powdery food ingredient to the construction chamber 61. Then, according to the control command from the control computer 2, the light curing means 63 emits a light beam to cure the powdery food ingredient in the construction chamber 61 so as to form a single layer structure matching a cross section profile of the food model. Then, the powder spreading mechanism 62 provides another layer of powdery food ingredient to the cured single layer structure in the construction chamber 61. Then, according to the control command from the control computer 2, the light curing means 63 emits a light beam to cure the powdery food ingredient in the construction chamber 61 so as to form another single layer structure matching another cross section profile of the food model. After the above steps are repeatedly done, the three-dimensional food product is produced by laminating multiple layers of the food ingredient. The light curing means 63 is supported on the movable carrying mechanism 64 and moved with the movable carrying mechanism 64.

In this embodiment, the powder spreading mechanism 62 comprises a powder feeder 621 and a powder spreader 622. The powder feeder 621 is used for containing the powdery food ingredient and allowing the powdery food ingredient therein to be moved upwardly or downwardly. The powder spreader 622 is located over the light curing means 63 and moved with the light curing means 63. As the powdery food ingredient in the powder feeder 621 is moved upwardly, the topmost layer of powdery food ingredient is pushed to the construction chamber 61 by the powder spreader 622.

In an embodiment, the powdery food ingredient is a powdery native food ingredient or a powdery molecular food ingredient composed of grains and root vegetables, fruits and vegetables, fruits, protein meat and fishes, milk, oil and sugar.

From the above descriptions, the present invention provides a three-dimensional cooking machine. The three-dimensional cooking machine uses food ingredients as the raw materials. The three-dimensional cooking machine can produce the desired three-dimensional food product by using the printhead to extrude or print out the food ingredient in a laminating manner. Alternatively, three-dimensional cooking machine can produce the desired three-dimensional food product by emitting a light beam to directly cure the food ingredient in a laminating manner. Alternatively, three-dimensional cooking machine can produce the desired three-dimensional food product by spreading a powdery food ingredient and using a light curing means. Consequently, the three-dimensional cooking machine of the present invention is capable of preparing delicious food products with various shapes.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A three-dimensional cooking machine, comprising:
   a control computer for storing an image file of a predetermined food model and outputting a control command corresponding to the image file of the food model; and
   a food ingredient laminating device comprising an ink-jet printer, wherein the ink-jet printer is controlled to perform a three-dimensional food laminating operation according to the control command from the control computer, and the ink-jet printer comprises:
      a working platform;
      a movable carrying mechanism;
      at least one printhead for ejecting a food ingredient, wherein the at least one printhead comprises a printhead platform, a food ingredient supply tank and a pressure regulator, wherein the food ingredient supply tank is located over the printhead platform and contains the food ingredient, and an internal pressure within the food ingredient supply tank is adjusted to be maintained at a negative pressure by the pressure regulator, wherein the printhead platform comprises a printhead chamber and plural nozzles, the plural nozzles are located under the printhead chamber, the plural nozzles are in communication with the printhead chamber, and the food ingredient supply tank and the pressure regulator are in communication with the printhead chamber, wherein the plural nozzles eject ink drops configured to be controlled to comply with the following conditions: a volume of each ink drop is in a range between 0.1~20000 picoliter, a diameter of each ink drop is in a range between 0.05 and 200000 picometer, a volume error of each ink drop is 20%, and an ejection rate of each ink drop is in a range between 0-10000 drops/second; and at least one base disposed on the working platform, wherein the movable carrying mechanism is located over the working platform, and movable along two horizontal axis directions and a vertical axis direction according to the control command from the control computer, wherein the at least one printhead is supported on the movable carrying mechanism, and freely moved along the two horizontal axis directions and the vertical axis direction to eject the food ingredient from the plural nozzles on the at least one base so as to produce a three-dimensional food product by laminating multiple layers of the food ingredient.

2. The three-dimensional cooking machine according to claim 1, wherein the control computer is a tablet computer, a mobile phone, a smart phone, a wearable device or any other comparable device.

3. The three-dimensional cooking machine according to claim 1, wherein the at least one printhead comprises plural printheads, and the plural printheads are installed in the printer platform, wherein the printer platform is disposed on the movable carrying mechanism and arranged along one of the two horizontal axis directions, and the printer platform is movable forwardly and backwardly in bidirectional reciprocation.

4. The three-dimensional cooking machine according to claim 1, wherein the at least one printhead comprises plural printheads, and the plural printheads are installed in the printer platform, wherein the printer platform is a page-width printing mechanism with plural immobile printheads, and the printer platform is disposed on the movable carrying mechanism and arranged along one of the two horizontal axis directions.

5. The three-dimensional cooking machine according to claim 1, wherein each of the at least one printhead comprises the food ingredient supply tank and a respective nozzle, wherein the food ingredient supply tank contains the food ingredient, and the nozzle is in communication with the food ingredient supply tank, wherein a path of moving the food ingredient is controlled by the control computer according to the control command, so that the food ingredient in the food ingredient supply tank is ejected from the nozzle to perform the three-dimensional food laminating operation by laminating multiple layers of the food ingredient.

6. The three-dimensional cooking machine according to claim 5, wherein the food ingredient is a fluidic bio-ink composed of tissue cells or cellular tissue foundations of animal organs, wherein the fluidic bio-ink is obtained from body cells of animals and cultivated on a large scale.

7. The three-dimensional cooking machine according to claim 5, wherein the food ingredient is a fluidic food ingredient composed of grains and root vegetables, fruits and vegetables, fruits, protein meat and fishes, milk, oil and sugar.

8. The three-dimensional cooking machine according to claim 5, wherein the food ingredient is a fluidic molecular food ingredient composed of grains and root vegetables, fruits and vegetables, fruits, protein meat and fishes, milk, oil and sugar.

9. The three-dimensional cooking machine according to claim 5, wherein the food ingredient is a fluidic spice adhesive.

10. The three-dimensional cooking machine according to claim 5, wherein the food ingredient is a fluidic additive composed of cellulose, vitamin, dietary mineral, protein, lipid, carbohydrate and glucose.

11. The three-dimensional cooking machine according to claim 5, wherein the food ingredient is a fluidic food coloring agent.

12. The three-dimensional cooking machine according to claim 1, wherein the food ingredient is a fluidic bio-ink composed of tissue cells or cellular tissue foundations of animal organs, wherein the fluidic bio-ink is obtained from body cells of animals and cultivated on a large scale.

13. The three-dimensional cooking machine according to claim 1, wherein the food ingredient is a fluidic or powdery food ingredient composed of grains and root vegetables, fruits and vegetables, fruits, protein meat and fishes, milk, oil and sugar.

14. The three-dimensional cooking machine according to claim 1, wherein the food ingredient is a fluidic or powdery molecular food ingredient composed of grains and root vegetables, fruits and vegetables, fruits, protein meat and fishes, milk, oil and sugar.

15. The three-dimensional cooking machine according to claim 1, wherein the food ingredient is a fluidic or powdery spice adhesive.

16. The three-dimensional cooking machine according to claim 1, wherein the food ingredient is a fluidic or powdery additive composed of cellulose, vitamin, dietary mineral, protein, lipid, carbohydrate and glucose.

17. The three-dimensional cooking machine according to claim 1, wherein the food ingredient is a fluidic or powdery food coloring agent or a powdery food coloring agent.

18. The three-dimensional cooking machine according to claim 1, wherein the control computer further comprises a three-dimensional scanner for scanning a three-dimensional food and obtaining an image file of the three-dimensional food, so that the image file is stored.

19. The three-dimensional cooking machine according to claim 1, wherein each of the at least one base is a sterile container that is placed on the working platform for containing the three-dimensional food product.

20. A three-dimensional cooking machine, comprising:
a control computer for storing image files of plural predetermined food models and outputting a control command corresponding to the image files of the plural food models; and
plural food ingredient laminating devices, wherein the plural food ingredient laminating devices are controlled to perform three-dimensional food laminating operations simultaneously according to the control command from the control computer, so that plural dishes are prepared by the plural food ingredient laminating devices simultaneously, wherein each of the food ingredient laminating device comprising an ink-jet printer, and the ink-jet printer comprises:

a working platform;

a movable carrying mechanism;

at least one printhead for ejecting a food ingredient, wherein the at least one printhead comprises a printhead platform, a food ingredient supply tank and a pressure regulator, wherein the food ingredient supply tank is located over the printhead platform and contains the food ingredient, and an internal pressure within the food ingredient supply tank is adjusted to be maintained at a negative pressure by the pressure regulator, wherein the printhead platform comprises a printhead chamber and plural nozzles, the plural nozzles are located under the printhead chamber, the plural nozzles are in communication with the printhead chamber, and the food ingredient supply tank and the pressure regulator are in communication with the printhead chamber, wherein the plural nozzles eject ink drops configured to be controlled to comply with the following conditions: a volume of each ink drop is in a range between 0.1~20000 picoliter, a diameter of each ink drop is in a range between 0.05 and 200000 picometer, a volume error of each ink drop is 20%, and an ejection rate of each ink drop is in a range between 0-10000 drops/second; and at least one base disposed on the working platform, wherein the movable carrying mechanism is located over the working platform, and movable along two horizontal axis directions and a vertical axis direction according to the control command from the control computer, wherein the at least one printhead is supported on the movable carrying mechanism, and freely moved along the two horizontal axis directions and the vertical axis direction to eject the food ingredient from the plural nozzles on the at least one base so as to produce a three-dimensional food product by laminating multiple layers of the food ingredient.

21. A three-dimensional cooking machine, comprising:

a control computer for storing an image file of a predetermined food model and outputting a control command corresponding to the image file of the food model; and a food ingredient laminating device comprising a construction chamber, a powder spreading mechanism and an ink-jet printer;

at least one printhead for ejecting a food ingredient, wherein the at least one printhead comprises a printhead platform, a supply tank and a pressure regulator, wherein the food ingredient supply tank is located over the printhead platform and contains the fluidic binder, wherein the printhead platform comprises a printhead chamber and plural nozzles, the plural nozzles are located under the printhead chamber, and the plural nozzles, the supply tank and the pressure regulator are in communication with the printhead chamber, and an internal pressure within the supply tank is adjusted to be maintained at a negative pressure by the pressure regulator, wherein the plural nozzles eject ink drops configured to be controlled to comply with the following conditions: a volume of each ink drop is in a range between 0.1~20000 picoliter, a diameter of each ink drop is in a range between 0.05 and 200000 picometer, a volume error of each ink drop is 20%, and an ejection rate of each ink drop is in a range between 0-10000 drops/second;

wherein the powder spreading mechanism provides a powdery food ingredient to the construction chamber, and the ink-jet printer ejects a fluidic binder on the powdery food ingredient according to the control command from the control computer, so that the fluidic binder and the powdery food ingredient stick together to form a single layer structure matching a cross section profile of the food model, wherein the powder spreading mechanism further provides a powdery food ingredient to a solidified single layer structure in the construction chamber, and then the ink-jet printer ejects a fluidic binder on the powdery food ingredient in the construction chamber according to the control command from the control computer, so that the fluidic binder and the powdery food ingredient stick together to form another single layer structure matching another cross section profile of the food model, wherein a three-dimensional food product is produced by laminating multiple single layer structures, wherein according to the control command from the control computer, the fluidic binder is ejected out form the plural nozzles to the powdery food ingredient in the construction chamber, wherein after the fluidic binder and the powdery food ingredient stick together to become solidified, the single layer structure matching the cross section profile of the food model is produced.

22. The three-dimensional cooking machine according to claim 21, wherein the powdery food ingredient is a powdery food ingredient composed of grains and root vegetables, fruits and vegetables, fruits, protein meat and fishes, milk, oil and sugar.

23. The three-dimensional cooking machine according to claim 21, wherein the powdery food ingredient is a powdery molecular food ingredient composed of grains and root vegetables, fruits and vegetables, fruits, protein meat and fishes, milk, oil and sugar.

24. The three-dimensional cooking machine according to claim 21, wherein the fluidic binder is a fluidic bio-ink composed of tissue cells or cellular tissue foundations of animal organs, wherein the fluidic bio-ink is obtained from body cells of animals and cultivated on a large scale.

25. The three-dimensional cooking machine according to claim 21, wherein the fluidic binder is a fluidic spice adhesive.

26. The three-dimensional cooking machine according to claim 21, wherein the fluidic binder is a fluidic binder additive composed of cellulose, vitamin, dietary mineral, protein, lipid, carbohydrate and glucose.

27. The three-dimensional cooking machine according to claim 21, wherein the fluidic binder is a fluidic food coloring agent.

* * * * *